United States Patent
Murata et al.

(10) Patent No.: US 12,358,267 B2
(45) Date of Patent: Jul. 15, 2025

(54) PROTECTIVE FILM AND SHEET

(71) Applicant: TOPPAN PRINTING CO.,LTD., Tokyo (JP)

(72) Inventors: Daisuke Murata, Tokyo (JP); Toru Ookubo, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 253 days.

(21) Appl. No.: 17/151,930

(22) Filed: Jan. 19, 2021

(65) Prior Publication Data

US 2021/0138774 A1    May 13, 2021

Related U.S. Application Data

(63) Continuation of application No. PCT/JP2019/029033, filed on Jul. 24, 2019.

(30) Foreign Application Priority Data

Jul. 26, 2018   (JP) ................. 2018-140252

(51) Int. Cl.
   *B32B 27/18*   (2006.01)
   *B32B 7/12*   (2006.01)
   (Continued)

(52) U.S. Cl.
   CPC ............... *B32B 27/18* (2013.01); *B32B 7/12* (2013.01); *B32B 27/32* (2013.01); *C08K 5/3432* (2013.01); *C08K 5/3475* (2013.01); *C08K 5/3492* (2013.01); *B32B 2250/02* (2013.01); *B32B 2250/05* (2013.01); *B32B 2307/412* (2013.01); *B32B 2307/712* (2013.01); *B32B 2307/732* (2013.01); *B32B 2323/10* (2013.01); *B32B 2451/00* (2013.01)

(58) Field of Classification Search
   CPC .......... B32B 27/18; B32B 7/12; B32B 27/32; B32B 2250/02; B32B 2307/412;
   (Continued)

(56) References Cited

U.S. PATENT DOCUMENTS 5,362,572 A  * 11/1994  Hamada ................. C08L 23/04
                                                      428/920
2010/0167061 A1 * 7/2010  Bennison .......... B32B 17/10743
                                                    428/476.3
(Continued)

FOREIGN PATENT DOCUMENTS

EP       3 632 978 A1    4/2020
JP       2005-120255 A   5/2005
(Continued)

OTHER PUBLICATIONS

International Searching Authority, "International Search Report," issued in connection with International Patent Application No. PCT/JP2019/029033, dated Sep. 10, 2019.

(Continued)

Primary Examiner — Samir Shah
(74) Attorney, Agent, or Firm — Foley & Lardner LLP

(57) ABSTRACT

A protective film containing a transparent polyolefin resin layer with improved or even superior weather resistance, and a sheet using the protective film. A protective film according to the present embodiment includes at least a transparent polyolefin resin layer. The transparent polyolefin resin layer contains a hindered amine light stabilizer represented by general formula (I) below in a range of 0.05 parts by mass or more and 5 parts by mass or less with respect to 100 parts by mass of a transparent olefin resin included in the transparent polyolefin resin layer. (In general formula (I), R is an alkyl group having 1-18 carbon atoms, or a cycloalkyl group having 5-8 carbon atoms.)

4 Claims, 1 Drawing Sheet

(51) Int. Cl.
    *B32B 27/32* (2006.01)
    *C08K 5/3432* (2006.01)
    *C08K 5/3475* (2006.01)
    *C08K 5/3492* (2006.01)

(58) Field of Classification Search
    CPC .......... B32B 2307/712; B32B 2323/10; C08K 5/3432; C08K 5/3475
    See application file for complete search history.

(56) References Cited

U.S. PATENT DOCUMENTS

| | | | | |
|---|---|---|---|---|
| 2016/0167348 | A1* | 6/2016 | Bennison | B32B 27/08 428/500 |
| 2019/0136034 | A1* | 5/2019 | Koshino | C08L 101/00 |
| 2020/0048445 | A1 | 2/2020 | Shibayama et al. | |

FOREIGN PATENT DOCUMENTS

| | | |
|---|---|---|
| JP | 2006-103074 A | 4/2006 |
| JP | 2011-236369 A | 11/2011 |
| JP | 2017-197639 A | 11/2017 |
| JP | WO2017217178 * | 12/2017 |
| WO | WO-2005/082852 A1 | 9/2005 |

OTHER PUBLICATIONS

International Searching Authority, "Written Opinion," issued in connection with International Patent Application No. PCT/JP2019/029033, dated Sep. 10, 2019.

European Extended Search Report, dated Sep. 30, 2021, issued in corresponding European Patent Application No. 19841928.5, (7 pages).

* cited by examiner

PROTECTIVE FILM AND SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/029033, filed on Jul. 24, 2019, which is based upon and claims the benefit of priority to Japanese Patent Application No. 2018-140252, filed on Jul. 26, 2018, the disclosures of which are incorporated herein by reference in their entireties.

TECHNICAL FIELD

The present invention relates to a protective film and a sheet using the protective film.

BACKGROUND

Conventionally, general printed matter does not have a high resistance to ultraviolet rays or water. Therefore, in applications such as decorative sheets and posters used outdoors which require resistance to these (weather resistance), a transparent protective film is provided on the surface layer for the purpose of protecting the printed matter.

As the material of the protective film layer, in addition to fluororesins and acrylic resins, which have excellent weather resistance, polyolefin resins and the like having a cost advantage are preferably used; however, additives such as hindered amine light stabilizers are generally used because the polyolefin resins themselves often have insufficient weather resistance. An example of a protective film in which a hindered amine light stabilizer has been added to a polyolefin resin is described in PTL 1.

There are macromolecular type and small-molecule type hindered amine light stabilizers, and the macromolecular type generally has a low likelihood of blooming or bleeding due to its low mobility in resins, which enables the weather resistance of the protective film to be maintained over long periods. On the other hand, although the small-molecule type is known to have a higher performance as a photostabilizer than the macromolecular type, there is a concern that blooming or bleeding may occur.

Furthermore, there are three major types of hindered amine light stabilizers on the market, namely NH type, N-alkyl type, and NO-alkyl type hindered amine light stabilizers. Although the NH type has a high radical capture efficiency, it has basicity and may be deactivated by acid rain or the like when exposed to the environment. Moreover, although the N-alkyl type generally has superior water resistance compared to the NH type and has superior compatibility with polyolefin resins, it has a low radical capture efficiency. In addition, the NO-alkyl type has low basicity and a high radical capture efficiency, and therefore, exhibits high performance as a photostabilizer.

Although NO-alkyl type small-molecule photostabilizers are promising materials if bleeding is not a problem, it is unknown which types of materials have superior bleed resistance and impart high weather resistance when the photostabilizer is applied to a transparent polyolefin.

[Citation List] [Patent Literature] PTL 1: JP 2017-197639 A

SUMMARY OF THE INVENTION

Technical Problem

The present invention has been made in light of the foregoing issues, and has an object of providing a protective film containing a transparent polyolefin resin layer with improved or even superior weather resistance, and a sheet using the protective film.

Solution to Problem

As a result of intensive investigation, the present inventors have found that the above aim is better achieved by a protective film whose transparent polyolefin resin contains a small-molecule hindered amine light stabilizer having a specific structure, and a sheet using the protective film, and have arrived at the present invention. Note that "small-molecule" above refers to a molecule having, for example, a weight average molecular weight of 1,500 or less.

An aspect of the present invention for solving the problems above is a protective film including at least a transparent polyolefin resin layer; wherein the transparent polyolefin resin layer includes a hindered amine light stabilizer represented by general formula (I) below in a range of 0.05 parts by mass or more and 5 parts by mass or less with respect to 100 parts by mass of a transparent olefin resin included in the transparent polyolefin resin layer.

[Chemical Formula 1]

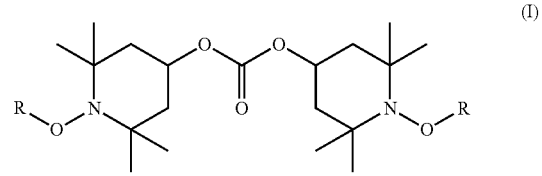

(In general formula (I), R is an alkyl group having 1-18 carbon atoms, or a cycloalkyl group having 5-8 carbon atoms.)

Advantageous Effects of the Invention

According to an aspect of the present invention, provided are a protective film containing a transparent polyolefin resin layer with improved or even superior weather resistance, and a sheet using the protective film.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

First Embodiment

Figure 1:
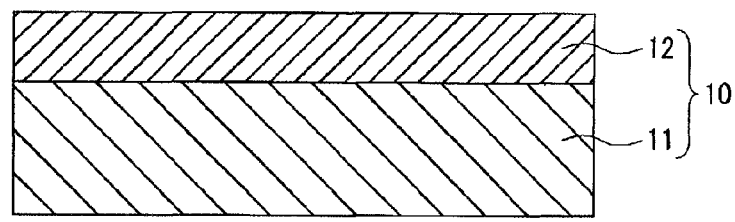
FIG. 1 is a schematic view showing a cross-section of a protective film according to a first embodiment of the present invention.

As a first embodiment of the present invention, the configuration of a protective film 10, in which a surface protective layer 12 is provided on a transparent polyolefin resin layer 11, will be described using FIG. 1. It is noted that identical or corresponding components are given the same reference numerals throughout the drawings described below, and redundant description will be omitted as appropriate. Furthermore, the present embodiment is only an example of a configuration for specifying the technical idea of the present invention, and accordingly, materials, shapes, structures, arrangements, and dimensions and the like of the individual parts should not be limited to those described below. The technical idea of the present invention can be modified in various ways within the technical scope defined by the claims.

(Transparent Polyolefin Resin Layer)

The protective film 10 according to the present embodiment includes a transparent polyolefin resin layer 11, and a surface protective layer 12 formed on one surface side of the transparent polyolefin resin layer 11, that is, above the transparent polyolefin resin layer 11.

Examples of the olefin resin constituting the transparent polyolefin resin layer 11 according to the present embodiment include, besides polypropylene, polyethylene, polybutene, and the like, a homopolymer or a copolymer of one or more α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, etc.), and a copolymer of ethylene or an α-olefin with another monomer, for example, an ethylene-vinyl acetate copolymer, ethylene-vinyl alcohol copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, and the like. Further, in order to improve the surface hardness of the protective film 10, for example, highly crystalline polypropylene is preferably used.

The transparent polyolefin resin layer 11 contains a hindered amine light stabilizer represented by general formula (I) below, and in particular, preferably contains carbonic acid bis(2,2,6,6-tetramethyl-1-undecyloxypiperidine-4-yl) represented by formula (II) below.

[Chemical Formula 2]

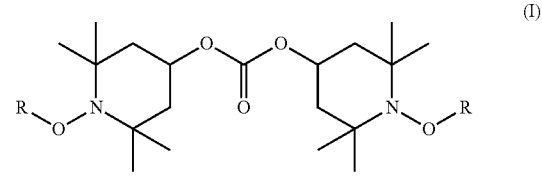

(I)

In general formula (I), R is an alkyl group having 1-18 carbon atoms, or a cycloalkyl group having 5-8 carbon atoms.

[Chemical Formula 3]

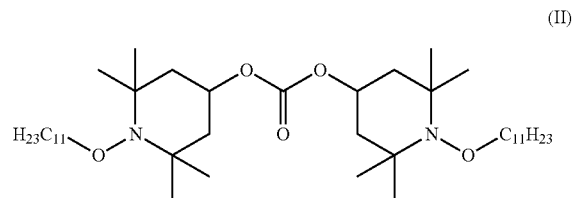

(II)

The content of the hindered amine light stabilizer is not particularly limited, and is appropriately set according to the thickness of the transparent polyolefin resin layer 11 and various conditions relating to the adhesive layer 20 and the substrate 30 described below; however, the content is typically within a range of 0.05 parts by mass or more and 5 parts by mass or less with respect to 100 parts by mass of the olefin resin included in the transparent polyolefin resin layer 11, and is preferably within a range of 0.1 parts by mass or more and 3 parts by mass or less. If the content of the hindered amine light stabilizer is less than 0.05 parts by mass, it is not possible to impart sufficient weather resistance to the transparent polyolefin resin layer, and if the content exceeds 5 parts by mass, the resistance (weather resistance) of the protective film remains unchanged, but there is a concern that the adhesion to the surface protective layer and the like may decrease, which is not preferable.

The transparent polyolefin resin layer 11 may contain another photostabilizer that does not correspond to the hindered amine light stabilizer mentioned above, and various additives such as an ultraviolet absorber, a thermal stabilizer, an antiblocking agent, a catalyst scavenger, a colorant, a light scattering agent, and a gloss adjuster may be added as necessary.

Examples of the additional photostabilizer include hindered amine light stabilizers such as 2-(3,5-di-tert-butyl-4-hydroxybenzyl)-2'-n-butylmalonatebis(1,2,2,6,6-pentamethyl-4-piperidyl), bis(1,2,2,6,6-pentamethyl-4-piperidyl) sebacate, and tetrakis(2,2,6,6-tetramethyl-4-piperidyl)-1,2,3,4-butanetetracarboxylate.

Examples of the ultraviolet absorber include hydroxyphenyltriazine compounds such as 2,4-bis(2,4-dimethylphenyl)-6-(2-hydroxy-4-n-octyloxyphenyl)-s-triazine, 2,4,6-tris(2-hydroxy-4-hexyloxy-3-methylphenyl)-s-triazine, 2-[2-hydroxy-4-(2-ethylhexyloxy)phenyl]-4,6-dibiphenyl-s-triazine, and 2-[[2-hydroxy-4-[1-(2-ethylhexyloxycarbonyl)ethyloxy]phenyl]]-4,6-diphenyl-s-triazine, and benzotriazole-based ultraviolet absorbers such as 2-(5-chloro-2H-benzotriazol-2-yl)-6-tert-butyl-4-methylphenol, and 2-(5-chloro-2-benzotriazolyl)-6-tert-butyl-p-cresol. Among these, it is preferable for the transparent polyolefin resin layer 11 to include a hydroxyphenyltriazine-based ultraviolet absorber and/or a benzotriazole-based ultraviolet absorber.

The content of the ultraviolet absorber is not particularly limited, and is appropriately set according to the thickness of the transparent polyolefin resin layer 11 and various conditions relating to the adhesive layer 20 and the substrate 30 described below; however, the content is typically within a range of 0.1 parts by mass or more and 2 parts by mass or less with respect to 100 parts by mass of the olefin resin. If the content of the ultraviolet absorber is less than 0.1 parts by mass, it may not be possible to impart a sufficient weather resistance to the transparent polyolefin resin layer. Furthermore, if the content of the ultraviolet absorber exceeds 2 parts by mass, the ultraviolet absorber may sometimes bleed out from the protective film 10 and cause problems in the adhesion and design properties of the sheet obtained by joining the protective film 10 and the substrate 30. Moreover, the transparent polyolefin resin layer 11 has a pronounced tendency to develop turbidity, which may cause a problem in the design properties.

The method of producing the transparent polyolefin resin layer 11 is not particularly limited, and common methods such as calendaring film formation and extrusion film formation can be used to form a transparent polyolefin resin layer containing the olefin resin, the hydroxyphenyltriazine-based ultraviolet absorber, and various additives as described above.

The transparent polyolefin resin layer 11 may be provided with surface projections and recesses to impart the design properties. The method of providing projections and recesses includes a method in which the transparent polyolefin resin film is formed by extrusion molding and then subjected to hot embossing, and a method in which embossing is carried out at the same time as extrusion molding using a cooling roll provided with projections and recesses at the time of extrusion molding.

(Surface Protective Layer)

The surface protective layer 12 according to the present embodiment is provided to impart functions such as weather resistance, scratch resistance, stain resistance, and design properties to the protective film 10, and the material thereof is not particularly limited; however, it can be appropriately selected from resin materials such as urethane-based, acrylic-based, acrylic silicone-based, fluorine-based, and epoxy-based resin materials.

The surface protective layer 12 may contain various additives such as an ultraviolet absorber, a thermal stabilizer, a photostabilizer, an anti-blocking agent, a catalyst scavenger, a colorant, a light scattering agent, and a gloss adjuster as necessary. Examples of the ultraviolet absorber and the photostabilizer include those applied to the transparent polyolefin resin layer 11 described above.

The method of forming the surface protective layer 12 is not particularly limited, and the surface protective layer 12 may be formed by applying a liquid coating of the above materials by a common method such as gravure coating, microgravure coating, comma coating, knife coating, or die coating, and then curing the coating by a method suitable for the material, such as heat curing or ultraviolet curing.

Furthermore, the surface protective layer 12 may be provided after joining the transparent polyolefin resin layer 11 and the substrate 30 described below.

Second Embodiment

Figure 2:
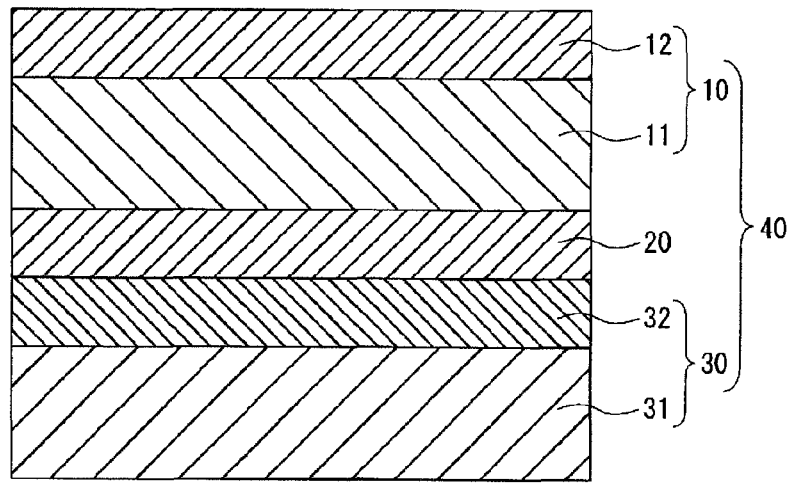
FIG. 2 is a schematic view showing a cross-section of a decorative sheet according to a second embodiment of the present invention.

As a second embodiment of the present invention, a configuration in which the protective film 10 according to the first embodiment and a substrate 30 are joined to form a decorative sheet 40 will be described using FIG. 2.

The decorative sheet 40 is configured by joining a protective film 10 provided with a surface protective layer 12 and a transparent polyolefin resin layer 11, that is, the protective film 10 according to the first embodiment, to a substrate 30 via an adhesive layer 20. Note that FIG. 2 shows a decorative sheet 40 in which the transparent polyolefin resin layer 11 provided in the protective film 10 is joined with a pattern layer 32 provided in the substrate 30 described below via an adhesive layer 20.

(Primary Film)

The substrate 30 includes a primary film 31, and a pattern layer 32 provided on one surface side of the primary film 31.

The primary film 31 may be selected from, for example, paper such as thin paper, titanium paper, and resin-impregnated paper, synthetic resins such as polyethylene, polypropylene, polybutylene, polystyrene, polycarbonate, polyester, polyamide, ethylene-vinyl acetate copolymer, polyvinyl alcohol, and acrylic resin, foams of these synthetic resins, rubber such as ethylene-propylene copolymer rubber, ethylene-propylene-diene copolymer rubber, styrene-butadiene copolymer rubber, styrene-isoprene-styrene block copolymer rubber, styrene-butadiene-styrene block copolymer rubber, and polyurethane, an organic or inorganic nonwoven fabric, synthetic paper, and metal foils such as aluminum, iron, gold, and silver.

With respect to the primary film 31, in order to supplement the adhesion of the primary film 31 with an adjacent layer, for example, one or both surfaces of the primary film 31 may be provided with a primer layer (not shown), and a surface treatment such as corona treatment, plasma treatment, ozone treatment, electron beam treatment, ultraviolet treatment, or dichromic acid treatment may also be performed.

(Pattern Layer)

The pattern layer 32 is, for example, a pattern printed on the primary film 31 using an ink. The ink used to form the pattern layer 32 may contain a binder, and the binder can be appropriately selected from, for example, nitrocellulose, cellulose, vinyl chloride-vinyl acetate copolymer, polyvinyl butyral, polyurethane, acrylic, and polyester binders, and modified products thereof. Furthermore, these may be any of aqueous, solvent, and emulsion types, and may be a one-part type or a two-part type which uses a curing agent.

Examples of the method of curing the ink used to form the pattern layer 32 include methods that cure an ink by irradiation of ultraviolet rays, an electron beam, or the like. Among these, the most typical method is the use of a urethane-based ink cured by isocyanate.

The ink used to form the pattern layer 32 includes, in addition to these binders, various additives included in a typical ink, and examples include colorants such as pigments or dyes, extender pigments, solvents, and photostabilizers. Examples of highly versatile pigments include condensed azo pigments, insoluble azo pigments, quinacridones, isoindolines, anthraquinones, imidazolones, cobalt, phthalocyanines, carbon, titanium oxide, iron oxide, pearl pigments such as mica, and the like.

The method of providing the pattern layer 32 is not particularly limited, and common printing methods such as gravure printing, offset printing, screen printing, flexo printing, and inkjet printing can be used.

(Adhesive Layer)

The adhesive layer 20 is not particularly limited, and is formed using appropriately selected resin material, such as a urethane-based, acrylic-based, acryl-silicon-based, fluorine-based, or epoxy-based resin material to form an ink material, and then performing a common coating method such as gravure coating, microgravure coating, comma coating, knife coating, or die coating.

The method of joining the substrate 30 and the protective film 10 is not particularly limited, and it is possible to use various lamination methods such as heat lamination, extrusion lamination, dry lamination, and sandwich lamination via the adhesive layer 20 as necessary.

In terms of the thickness of each layer constituting the decorative sheet 40 according to the present embodiment, it is preferable for the thickness of the primary film 31 to be 20 μm to 150 μm in consideration of the printing workability and cost, and the thickness of the adhesive layer 20 to be 1 μm to 20 μm, the transparent polyolefin resin layer 11 to be 20 μm to 200 μm, and the surface protective layer 12 to be 3 μm to 20 μm. Furthermore, the total thickness of the decorative sheet 40 is preferably in a range of 45 μm to 250 μm.

Hereinafter, the present invention will be described in detail by way of Examples and Comparative Examples.

Example 1

To 100 parts by mass of a transparent homopolypropylene resin (Prime PP; manufactured by Prime Polymer Co. Ltd) were added 0.3 parts by mass of a photostabilizer (Tinuvin 1600; manufactured by BASF Japan Ltd.) and 0.5 parts by mass of the photostabilizer (photostabilizer A) represented by formula (A) below (ADEKA STAB LA-81; manufactured by ADEKA Corporation) as the photostabilizer, and the protective film of Example 1 was obtained by melt extrusion of the resulting resin composition at a thickness of 80 μm.

Then, a substrate was obtained by forming a pattern layer (thickness 3 μm) by gravure printing a wood grain pattern using a two-part urethane ink (V180; manufactured by Toyo Ink Co., Ltd.) on an opaque polyethylene primary film (thickness 70 μm), and the protective film described above was dry laminated via an adhesive for dry lamination (Takerack A540; manufactured by Mitsui Chemicals, Inc.) (thickness 2 μm). The protective film described above was further coated with a surface protective layer in the form of a two-part curing polyurethane resin layer (layer thickness 8 μm) composed of an acrylic polyol (a copolymer of methyl methacrylate and 2-hydroxymethacrylate) and a curing agent (a nurate of hexamethylene diisocyanate), thereby affording the decorative sheet of Example 1.

Example 2

Except for the addition of 0.75 parts by mass of the photostabilizer A as the photostabilizer in Example 1, the decorative sheet of Example 2 was obtained using the same method as Example 1.

Example 3

Except for the addition of 1.0 parts by mass of the photostabilizer A as the photostabilizer in Example 1, the decorative sheet of Example 3 was obtained using the same method as Example 1.

Comparative Example 1

Except for the addition of 0.5 parts by mass of the photostabilizer (photostabilizer B) represented by formula (B) below (Tinuvin 123; manufactured by BASF Japan Ltd.) as the photostabilizer in Example 1, the decorative sheet of Comparative Example 1 was obtained using the same method as Example 1.

Comparative Example 2

Except for the addition of 0.75 parts by mass of the photostabilizer B as the photostabilizer in Example 1, the decorative sheet of Comparative Example 2 was obtained using the same method as Example 1.

Comparative Example 3

Except for the addition of 1.0 parts by mass of the photostabilizer B as the photostabilizer in Example 1, the decorative sheet of Comparative Example 3 was obtained using the same method as Example 1.

Comparative Example 4

Except for the addition of 0.5 parts by mass of the photostabilizer (photostabilizer C) represented by formula (C) below (Tinuvin NOR 371; manufactured by BASF Japan Ltd.) as the photostabilizer in Example 1, the decorative sheet of Comparative Example 4 was obtained using the same method as Example 1.

Comparative Example 5

Except for the addition of 0.75 parts by mass of the photostabilizer C as the photostabilizer in Example 1, the decorative sheet of Comparative Example 5 was obtained using the same method as Example 1.

Comparative Example 6

Except for the addition of 1.0 parts by mass of the photostabilizer C as the photostabilizer in Example 1, the decorative sheet of Comparative Example 6 was obtained using the same method as Example 1.

[Chemical Formula 4]

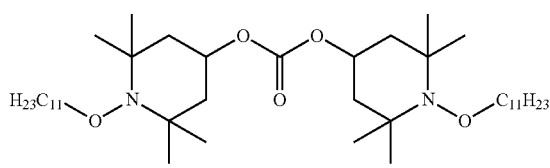

(A)

[Chemical Formula 5]

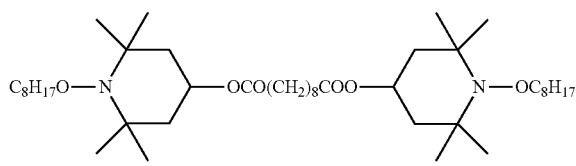

(B)

[Chemical Formula 6]

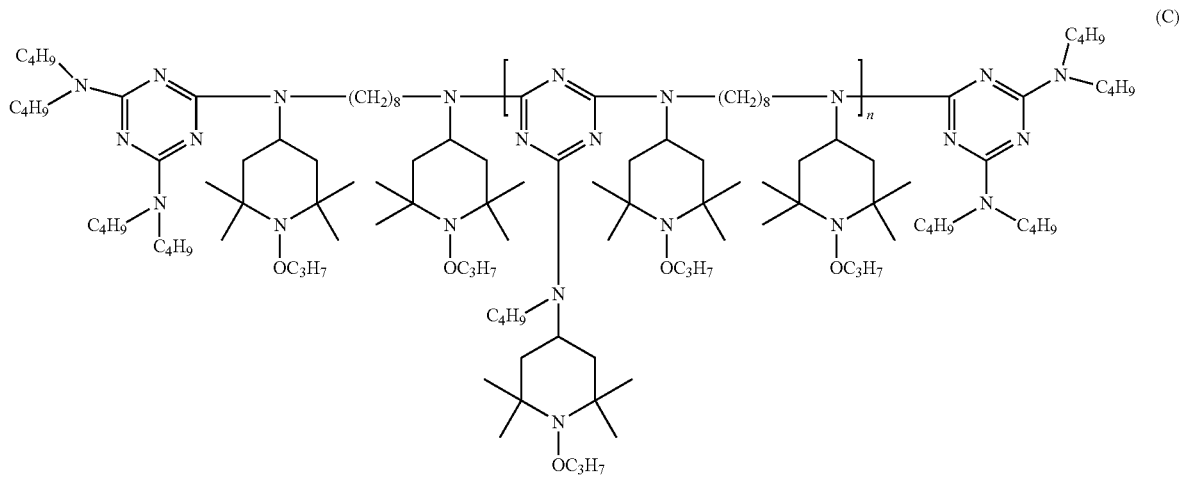

(C)

Evaluation

The weather resistance of the decorative sheets obtained in the above Examples and Comparative Examples was evaluated according to the following method. The evaluation results are shown in Table 1.

The appearance of the decorative sheet was visually evaluated after an accelerated weathering test according to the following criteria. The accelerated weathering test was performed using an EYE Super UV Tester (SUV-W161; Iwasaki Electric Co., Ltd.) at a black panel temperature of 63° C. and an illuminance of 65 mW/cm$^2$ over a period of (UV irradiation 20 hours+condensation 4 hours) for each cycle, and the appearance of the decorative sheet was visually evaluated after 20 cycles (480 hours), 25 cycles (600 hours), and 30 cycles (720 hours), respectively.

(Visual Evaluation Criteria)

Good: No change in appearance of decorative sheet

Fair: Whitening observed in decorative sheet

Poor: Cracking observed in decorative sheet

If the evaluation of the weather resistance resulted in "Good" or "Fair", the specimen was taken as acceptable because there was no problem associated with its use.

TABLE 1

| | Photostabilizer | | Weather resistance (number of weather resistance test cycles) | | |
|---|---|---|---|---|---|
| | Type | Parts by mass | 20 | 25 | 30 |
| Example 1 | ADEKA STAB LA-81 | 0.5 | Good | Good | Fair |
| Example 2 | | 0.75 | Good | Good | Fair |
| Example 3 | | 1.0 | Good | Good | Good |
| Comparative Example 1 | Tinuvin 123 | 0.5 | Poor | Poor | Poor |
| Comparative Example 2 | | 0.75 | Good | Poor | Poor |
| Comparative Example 3 | | 1.0 | Good | Poor | Poor |
| Comparative Example 4 | Tinuvin NOR 371 | 0.5 | Good | Poor | Poor |
| Comparative Example 5 | | 0.75 | Poor | Poor | Poor |
| Comparative Example 6 | | 1.0 | Poor | Poor | Poor |

As shown in Table 1, by adding hindered amine light stabilizers having the specific structures above to the transparent polyolefin resin layer, the protective films and the decorative sheets according to the present embodiment as exemplified by Examples 1 to 3 exhibit weather resistance of at least that of Tinuvin 123 and Tinuvin NOR 371, which are existing NO-alkyl type hindered amine light stabilizers.

INDUSTRIAL APPLICABILITY

In addition to decorative sheets and sheets used outdoors such as posters and signs, the present invention can be used as sheets used indoors, such as surface materials for joinery and floor materials.

REFERENCE SIGNS LIST

10: Protective film; 11: Transparent polyolefin resin layer; 12: Surface protective layer; 20: Adhesive layer; 30: Substrate; 31: Primary film; 32: Pattern layer; 40: Decorative sheet.

What is claimed is:

1. A protective film, consisting of: a transparent polyolefin resin layer; and a surface protective layer formed on the transparent polyolefin resin layer; wherein the surface protective layer is an outermost layer of the protective film; wherein the transparent polyolefin resin layer consists of a polyolefin resin and a hindered amine light stabilizer represented by general formula (I) below in a range of 0.05 parts by mass or more and 5 parts by mass or less with respect to 100 parts by mass of the polyolefin resin of the transparent polyolefin resin layer, wherein in general formula (I), R is an alkyl group having 1-18 carbon atoms, or a cycloalkyl group having 5-8 carbon atoms,

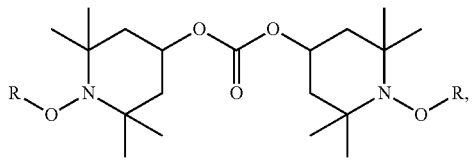
(I)

wherein the polyolefin resin of the transparent polyolefin resin layer does not contain an ethylene-vinyl acetate copolymer.

2. The protective film of claim 1, wherein the hindered amine light stabilizer has a structure represented by formula (II) below:

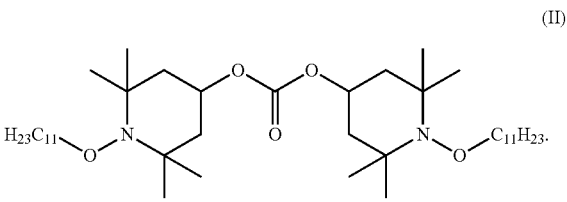
(II)

3. A sheet, comprising the protective film of claim 1 and a substrate.

4. The protective film of claim 1, wherein the polyolefin resin of the transparent polyolefin resin layer is selected from the group consisting of a homopolymer and a copolymer of one or more α-olefins.

* * * * *